United States Patent [19]

Szentivanyi et al.

[11] Patent Number: 4,963,621

[45] Date of Patent: Oct. 16, 1990

[54] CROSS-LINKABLE MIXTURES BASED ON HYDROGENATED NITRILE RUBBER AND ETHYLENE/ACRYLONITRILE COPOLYMERS

[75] Inventors: Zsolt Szentivanyi, Tokyo, Japan; Werner Obrecht, Moers; Jürgen Wassen, Leverkusen, both of Fed. Rep. of Germany

[73] Assignee: Bayer Aktiengesellschaft, Leverkusen, Fed. Rep. of Germany

[21] Appl. No.: 475,248

[22] Filed: Feb. 5, 1990

[30] Foreign Application Priority Data

Feb. 16, 1989 [DE] Fed. Rep. of Germany ....... 3904715

[51] Int. Cl.$^5$ .................... C08L 23/08; C08L 9/03; C08L 35/04
[52] U.S. Cl. .................................. 525/207; 525/225; 525/193; 525/194; 525/226
[58] Field of Search ..................... 525/207, 225, 226

[56] References Cited

U.S. PATENT DOCUMENTS

| | | | |
|---|---|---|---|
| 4,197,263 | 4/1980 | Li et al. | 525/207 |
| 4,421,884 | 12/1983 | Oyama et al. | 524/209 |
| 4,675,248 | 6/1987 | Buding et al. | 428/398 |

FOREIGN PATENT DOCUMENTS

| | | |
|---|---|---|
| 1053779 | 3/1959 | Fed. Rep. of Germany . |
| 3339385 | 5/1985 | Fed. Rep. of Germany . |
| 3229871 | 2/1983 | Fed. Rep. of Germany . |

Primary Examiner—Carman J. Seccuro
Attorney, Agent, or Firm—Connolly and Hutz

[57] ABSTRACT

Rubber mixtures of hydrogenated nitrile rubber and ethylene/acrylonitrile copolymers, which contain co-polymerized units of compounds with at least two (meth-)acryloyl groups, are easy to process and give vulcanized materials of high solvent resistance without any deterioration in the mechanical properties.

6 Claims, No Drawings

CROSS-LINKABLE MIXTURES BASED ON HYDROGENATED NITRILE RUBBER AND ETHYLENE/ACRYLONITRILE COPOLYMERS

The invention concerns mixtures based on (1) hydrogenated nitrile rubber and (2) ethylene/acrylonitrile copolymers containing copolymerized units of certain multi-functional compounds, the use of these mixtures for the production of vulcanized materials and these vulcanized materials themselves.

DE-OS No. 3 229 871 describes oil-resistant rubber compositions which are easy to process (because of their viscosity) comprising 50 to 98 parts by weight of a partly hydrogenated nitrile rubber and 2 to 50 parts by weight of a fluid copolymer, e.g. a butadiene/acrylonitrile copolymer. The vulcanized materials produced from these compositions have a high resistance to solvents. This desirable property is however achieved at the cost of a deterioration in mechanical properties; cf. DE-OS No. 3 229 871 Table IV comparison 2 and example 6.

Surprisingly, it has now been found that rubber mixtures of:
(1) hydrogenated nitrile rubber and
(2) ethylene/acrylonitrile copolymer which contains copolymerized units of compounds with at least two acryloyl or methacryloyl groups per molecule, are easy to process and give vulcanized materials with a high solvent resistance without any significant deterioration in the mechanical properties.

The objects of the invention are therefore mixtures of:
(1) 20 to 98, preferably 75 to 95 w. % in relation to the sum of components (1)+(2), hydrogenated nitrile rubber and
(2) 80 to 2, preferably 25 to 5 w. % in relation to the sum of components 1)+2), ethylene/acrylonitrile copolymer,
where the copolymer 2) contains 50 ppm to 2 w. %, preferably 100 ppm to 1 w. %, copolymerized (meth-)acryloyl compound with at least 2 acryloyl or methacryloyl groups per molecule of this (meth-) acryloyl compound.

The hydrogenation of nitrile rubber is well-known; U.S. Pat. No. 3,700,637, DE-OS Nos. 2 539 132, 3 046 008, 3 046 251, 3 227 650, 3 329 974, EP-A No. 111 412, FR-PS No. 2 540 503. Hydrogenated nitrile rubber is mainly characterised by a relatively high stability against oxidation.

The hydrogenated nitrile rubber (1) is based on butadiene/acrylonitrile copolymers with a copolymerized acrylonitrile content of 10 to 60, preferably 20 to 50 w. %. "Hydrogenated" in the sense of the invention means that both partly hydrogenated nitrile rubbers in which at least 80%, preferably between 85% and 95%, of the double bonds are hydrogenated, and fully hydrogenated nitrile rubbers in which preferably at least 95%, in particular at least 99%, of the hydrogenizable C=C double bonds (i.e. usually: the units originating from butadiene) are hydrogenated, whereas the C≡N triple bonds of the nitrile groups essentially, i.e. at least 90% of the nitrile groups originally present, remain unhydrogenated. The degree of hydrogenation can be determined by IR or NMR spectroscopy and by the usual chemical methods.

The hydrogenated nitrile rubber 1) usually has Mooney viscosities (DIN 53 523) from 10 to 150, preferably 25 to 120 (ML 1+4) 100 ° C.

(Meth-)acryloyl compounds preferred for the production of the ethylene/acrylonitrile copolymer 2) are compounds with a molecular weight of 126 to 1000, preferably 126 to 500, for example acrylic anhydride, methacrylic anhydride, the acrylates and methacrylates of polyvalent, in particular 2- and 3-valent, aliphatic, cycloaliphatic, araliphatic and aromatic alcohols with 2 to 24 C-atoms per molecule, for example ethylene glycol, acrylate and methacrylate, propanediol-1,2 and -1,3, butanediol-1,2, -1,3, -2,3 and 1,4, neopentyl glycol, hexanediols, in particular hexanediol-1,6, cyclohexanediol -1,4, 1,4-bis (hydroxymethyl)-cyclohexane, hydroquinone, resorcinol, bisphenol-A, ethoxylated bisphenol-A, hydroquinone-di(β-hydroxyethyl)-ether, glycerin, trimethylolethane and -propane, phloroglucinol.

Preferred (meth-)acryloyl compounds are also acrylates and methacrylates of polyetherpolyols, preferably polyethylene and polypropylene glycols with 1 to 20, preferably 1 to 12, etheroxygen atoms per molecule; in particular di- and triethylene glycol and di- and tripropylene glycol.

In addition to the (meth-)acryloyl compounds to be used, up to 10 w. % of the sum of the ethylene and acrylonitrile monomers to be used can be replaced by other comonomers. Preferred examples of such comonomers are carbon monoxide and above all compounds which, in addition to a copolymerized C=C double bond, also contain a reactive group which remains in the polymer chain on integration of the monomers and facilitates vulcanization of the resultant copolymer with various vulcanization means. Such comonomers with reactive groups are for example compounds of the formula:

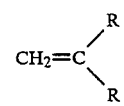

where

R = H, —CH₃, —C₂H₅, —COOH and

R' = —COOH, —CONH₂, —COOCH₂OH,

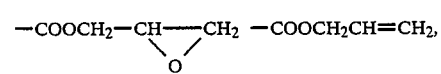

—COOCH₂CH₂Cl, —CONHCH=CH₂

The ethylene/acrylonitrile copolymers may be produced using the mass high pressure process under pressures of 500 to 5000, preferably 1000 to 3000, bar and temperatures of 50° to 450° C., preferably 120° to 350° C.

The process for the production of the ethylene/acrylonitrile copolymer (2) may be initiated with radical-forming substances. Suitable polymerization initiators include those compounds which are also used for high-pressure polymerization of ethylene. For example, oxygen is suitable, preferably in quantities of 10 to 1000 mole-ppm in relation to the monomers to be polymerized.

Other preferred polymerization initiators are for example azo-compounds such as azo-bis-isobutyronitrile and peroxides, hydroperoxides and their mixtures, above all however mixtures of oxygen and peroxides and/or hydroperoxides. Preferred peroxides and hydroperoxides include tert.-butylperpivalate, di-tert.-butylperoxide, tert.-butyl-hydroperoxide, tert.-butylperbenzoate, dilauroylperoxide, tert.-butylperisooctanoate and tert.-butylperisononanate. Particularly suitable are the peroxides di-tert.-butylperoxide, tert.-butylperpivalate and tert.butylperisononanate.

The concentration of the initiator added generally lies between 0.001 and 100 mole-ppm, preferably 0.1 to 30 mole-ppm, in relation to all the monomers added to (i.e. used in) the polymerization. Suitable solvents for the initiator are aliphatic hydrocarbons such as octane and benzene. Other inert solvents such as chlorobenzene, cyclohexane or methanol may however also be used.

The usual regulators, e.g. hydrocarbons such as propane, propene, iso-octane, ketones such as acetone, ethylmethylketone, aldehydes such as propionaldehyde, have a controlling effect here.

Therefore such substances should preferably not be added. If their use is essential, e.g. as solvents for the initiator or for rinsing stirrers, the controlling influence of these compounds may be compensated by an increased level of (meth-) acryloyl compound or by the addition of normal cross-linking agents.

Polymerization normally takes place under adiabatic reaction conditions in a continuous process. An agitation autoclave or a cascade of such autoclaves may be used as a reactor. For the performance of such a process, a tube reactor or a combination of an agitation autoclave and a tube reactor is suitable.

The series method with several agitation autoclaves is particularly suitable.

The ethylene/acrylonitrile copolymer (2) can for example be produced as follows: after polymerization, the reaction mixture is passed to a high pressure product separation zone which has a pressure of between 100 and 500 bar and a temperature between 150° and 300° C. The copolymer obtained in the reactor is separated from non-polymerized monomers in this high pressure product separator. The copolymer is passed from the high pressure product separator to the low pressure product separation zone which has a pressure of less than 10 bar.

From the low pressure product separator, the product obtained is passed over a discharge device, cooled and granulated. An underwater granulator is used for preference, where the water used can contain additives to reduce the conglutination tendency of the granulate. It is also preferable for the product to be dissolved, after the low pressure product separator, in a suitable solvent such as for example chlorinated hydrocarbons (chlorobenzene, di-chlorobenzene, methylene chloride, chloroform), ketones (acetone, methylethylketone) or ethers (tetrahydrofuran, dioxan), then mixed with a solution of hydrogenated nitrile rubber and isolated as a polymer blend.

The ethylene/acrylonitrile copolymers (2) preferably have gel contents of less than 0.2 w. % in relation to the copolymer and determined as the insoluble residue after 24 hour extraction with chlorobenzene in Soxhlet apparatus. The gel proportion can easily be recognized qualitatively as a surface roughness of extruded copolymer strands with diameters 2 to 5 mm.

The melt flow index (MFI) of the ethylene/acrylonitrile copolymer (2) usually lies between 0.1 g/10 min (measured at 190° C./2.16 kp) and 100 g/10 min (measured at 120 ° C./2.16 kp); its molecular weights determined as number average $M_n$ lie in the range from 15,000 to 200,000, preferably from 22,000 to 70,000 (membrane-osmometrically determined in chlorobenzene); its Mooney viscosities to DIN 53 523 generally amount to 1 to 120, preferably 1 to 20 (ML 1+4) 100° C.

The components can be mixed in normal mixing apparatus.

Preferred mixing devices are the kneaders, rollers, masticators and mixing extruders normally used in the rubber industry, which operate with shearing rates of 1 to 1000 $sec^{-1}$, preferably 1 to 200 $sec^{-1}$.

To the mixtures according to the invention can be added the normal fillers and auxiliaries, for example softeners, resins, factices and stabilizers, to achieve certain properties of the raw or vulcanized material.

For most applications, the mixtures according to the invention are used in vulcanized form. The vulcanization may—after the addition of fillers, stabilizers etc. where applicable—be carried out for example by energy-intensive radiation or by cross-linking with peroxides or by multi-functional cross-linking compounds (such as triallylcyanurate, triallylisocyanurate, bis-maleicimides or divinylbenzene).

"Vulcanized" in the sense of the invention means that with 10 hours extraction in Soxhlet apparatus with toluene as the extraction means, less than 10, preferably less than 5 w. % can be extracted in relation to the sum of components (1) and (2).

The vulcanization with peroxides may take place at temperatures from 100° to 200° C., preferably 130° to 180° C., where applicable under a pressure of 10 to 200 bar. After vulcanization, the vulcanized material may be tempered by storage at high temperature.

The vulcanized material obtained may for example be used in the form of seals, hoses, cable sleeves and articles under dynamic load, such as drive and gear belts, air springs, damping elements etc.

The parts stated in the following examples are parts by weight; percentage figures mean w. %.

EXAMPLES

As the hydrogenated nitrile rubber (1) (HNBR), the hydrogenation product of a butadiene/acrylonitrile copolymer with an acrylonitrile content of 34.8% and a C=C double bond hydrogenation degree of over 99% was used. The hydrogenated nitrile rubber had a Mooney viscosity of 77 (ML 1+4) 100° C.

As the ethylene/acrylonitrile copolymer (2) (EANMA), a copolymer with a Mooney viscosity of 3 (ML 1+4) 100° C. and a copolymerized acrylonitrile content of 30.8%, produced with 950 ppm methacrylic anhydride, was used.

The components were mixed on a roller, vulcanized for 20 minutes at 170° C. and tempered for 4 hours at 150° C. The recipes and values measured are shown in the following table.

| Example | Reference | 1 | 2 |
| --- | --- | --- | --- |
| HNBR | 100 | 90 | 75 |

-continued

| Example | | Reference | 1 | 2 |
|---|---|---|---|---|
| EANMA | | — | 10 | 25 |
| Carbon black N 762 | | 80 | 80 | 80 |
| ZnO | | 2 | 2 | 2 |
| Trioctyltrimellitate | | 8 | 8 | 8 |
| MgO | | 3 | 3 | 3 |
| Triallylisocyanurate | | 1.5 | 1.5 | 1.5 |
| Bis(tert.-butylperoxyiso-propyl)benzene (40%) | | 7.0 | 7.5 | 8.0 |
| Mooney viscosity of mixture | (ML1 + 4/ 100° C.) | 115 | 103 | 80 |
| Tensile strength (F) | (MPa) | 24 | 23 | 20 |
| Elongation at break (D) | (%) | 210 | 230 | 220 |
| Tensile stress at 100% elongation (S) | (MPa) | 8.7 | 8.6 | 8.8 |
| Hardness (Shore A) | | 77 | 77 | 79 |
| Ageing in cell oven 7 days/150° C. | | | | |
| $(F-F_o/F) \cdot 100$ (1) | (%) | −1 | −7 | −5 |
| $(D-D_o/D) \cdot 100$ (2) | (%) | −39 | −39 | −39 |
| $(S-S_o/S) \cdot 100$ (3) | (%) | +91 | +81 | +68 |
| Δ Hardness | (Shore A) | +6 | +7 | +4 |

(1) Percentage change in tensile strength
(2) Percentage change in elongation at break
(3) Percentage change in tensile stress

I claim:

1. Mixtures of:
   (1) 20 to 98 wt. %, based on the sum of components (1)+(2), of hydrogenated nitrile rubber, and
   (2) 80 to 2 wt. %, based on the sum of components (1)+(2), of ethylene/acrylonitrile copolymer, where the copolymer (2) contains 50 ppm to 2 wt. % of copolymerized (meth-)acryloyl compound selected from the group consisting of acrylic anhydrides, methacrylic anhydrides, and acrylates or methacrylates of polyvalent alcohols or polyether alcohols with at least 2 acryloly- or methacryloyl groups per molecule of this (meth-)acryloyl compound.

2. Mixtures according to claim 1 of:
   (1) 75 to 95 wt. % hydrogenated nitrile rubber and
   (2) 25 to 5 wt. % ethylene/acrylonitrile copolymer.

3. Mixtures according to claim 1, where the copolymer (2) contains 100 ppm to 1 wt. % copolymerized (meth-)acryloyl compound.

4. Mixtures according to claim 1, where acrylic or methacrylic anhydride is used as the (meth-)acryloyl compound.

5. Use of the mixtures according to claim 1 for the production of vulcanized materials.

6. Vulcanized materials produced from the mixtures according to claim 1.